United States Patent [19]
Aoki

[11] Patent Number: 6,151,419
[45] Date of Patent: Nov. 21, 2000

[54] IMAGE READING METHOD AND IMAGE READING APPARATUS

[75] Inventor: Takeshi Aoki, Nagano, Japan

[73] Assignee: Seiko Epson Corporation, Tokyo, Japan

[21] Appl. No.: 09/048,786

[22] Filed: Mar. 27, 1998

[30] Foreign Application Priority Data

| Mar. 27, 1997 | [JP] | Japan | 9-076250 |
| Apr. 2, 1997 | [JP] | Japan | 9-084240 |
| Jan. 8, 1998 | [JP] | Japan | 10-002063 |
| Jan. 8, 1998 | [JP] | Japan | 10-002064 |

[51] Int. Cl.[7] .......................... H04N 1/40; H04N 1/401; H04N 1/409
[52] U.S. Cl. ........................................ 382/274; 358/461
[58] Field of Search ............................ 382/274; 350/461, 350/406, 474, 471, 443

[56] References Cited

U.S. PATENT DOCUMENTS

| 5,099,341 | 3/1992 | Nosaki et al. | 358/461 |
| 5,151,796 | 9/1992 | Ito et al. | 358/461 |
| 5,260,809 | 11/1993 | Tachikawa | 358/461 |
| 5,347,370 | 9/1994 | Ishihara et al. | 358/461 |

FOREIGN PATENT DOCUMENTS

| 0 439 357 | 7/1991 | European Pat. Off. | H04N 1/028 |
| 0 439 358 | 7/1991 | European Pat. Off. | H04N 1/028 |
| 0 552 849 | 7/1993 | European Pat. Off. | H04N 1/40 |
| 40 20 817 | 1/1991 | Germany | H04N 1/38 |
| 2 110 899 | 6/1983 | United Kingdom | H04N 1/40 |

*Primary Examiner*—Scott Rogers
*Attorney, Agent, or Firm*—Sughrue, Mion, Zinn, Macpeak & Seas, PLLC

[57] ABSTRACT

An image reading apparatus includes: a line sensor 5 for converting light from an original into an electric signal; an A/D converting unit 12 for converting the electric signal derived from the line sensor 5 into a digital signal; a white reference storage unit 24 for storing white reference data set before the original is read; a black reference storage unit 22 for storing black reference data set before the original is read; a light-source light amount detecting unit for detecting a light amount of a light source; and a shading correcting unit 13 for shading-correcting an output signal derived from the A/D converting unit 12 with employment of both white reference data corrected by a white reference correction coefficient and the black reference data. As a consequence, the shading corrections can be performed along both a main scanning direction and a sub-scanning direction. Also, an image reading method includes: a) a step for detecting and setting sub-scanning white reference data when white reference data used in a shading correction is set; b) a step for detecting sub-scanning white reference data in each of reading lines; c) a step for setting as a white reference correction coefficient a ratio of a difference between the sub-scanning white reference data when said white reference data is set and black reference data to another difference between said sub-scanning white reference data in the respective reading lines and said black reference data; and d) a step for reading the original while executing a shading correction with employment of white reference data corrected by the white reference correction coefficient. In this image reading method, in the case where a plurality of the originals are read, the above-described steps b), c), and d) are repeatedly performed. As a result, since the setting operation for setting again the white reference data can be omitted, the time period required to read the image can be shortened.

9 Claims, 6 Drawing Sheets

IMAGE READING METHOD AND IMAGE READING APPARATUS

BACKGROUND OF THE INVENTION

The present invention relates to an image reading apparatus for converting an image of an original into an electric signal.

In a conventional image reading apparatus, for example, in a flat bed type image reading apparatus, an original base made of a transparent plate such as glass is provided on an upper surface of a box type housing. A carriage is provided inside the housing, and this carriage is transported by a drive apparatus in parallel to the original base. Both a light source and a line sensor in which a large number of photoelectric converting elements are arrayed are mounted on this carriage. The irradiation light emitted from the light source is reflected on a surface of an original set on the original base, and then is condensed by a condenser lens onto the line sensor.

A second light source movable in conjunction with the transport of the carriage is provided above the original base in order that a transparency original such as a photographic film is read.

When an image of an original is read, the light emitted from the light source is irradiated onto the original positioned on the original base, and either the reflection light or the transmission light from the original is condensed by the condenser lens onto the line sensor. While the carriage is transported, dark/light information of the original is detected and converted into the electric signal. It should be understood that a direction along which the photoelectric converting elements of the line sensor are arrayed is referred to as a main scanning direction, whereas another direction positioned perpendicular to the main scanning direction, along which both the carriage and the line sensor are traveled, is referred to as a sub-scanning direction.

An output signal derived from the line sensor is amplified by an amplifier and the amplified signal is A/D-converted into a digital signal by an A/D converting unit. In such a case that reading gradation is selected to be 8 bits, this digital signal owns numeral values from 0 to 255.

However, generally speaking, it is practically difficult to irradiate light emitted from a light source onto an original in a uniform light amount, and the light amounts of the light source adjacent to both edges thereof are lowered. Also, since there are fluctuations in the sensitivities of the photoelectric converting elements of the line sensor, even when an original having uniform density is read by this line sensor, the levels of the sensor signal outputted from this line sensor become irregular. There is such a problem that the gradation of this original cannot be correctly reproduced.

To solve this problem, a shading correction is carried out in a shading correcting unit. In accordance with the shading correction, before reading the original, both black reference data and white reference data as to the respective photoelectric converting elements are previously acquired to be stored. A digital light signal is shading-corrected by using these previously stored black/white data based on the following formula:

$$Dn' = A \cdot (Dn-Dk)/(Dw-Dk),$$

where symbol "Dn" shows digital signal data before being corrected, symbol "Dk" shows the black reference data, symbol "Dw" represents the white reference data, symbol "A" indicates a constant, and symbol "Dn'" denotes data after being shading-corrected. As to the white reference data, for example, a uniform reflection plane having high reflectivity positioned as a white reference at the edge portion of the original base is read to acquire a sensor signal, and this sensor signal is used as this white reference data. As to the black reference data, when the light source is turned OFF and this uniform plane having high reflectivity is read to acquire a sensor signal, this sensor signal is used as this black reference data. A white reference used to execute the shading correction along the main scanning direction is referred to as a main scanning white reference, or simply as a white reference.

Figure 10:
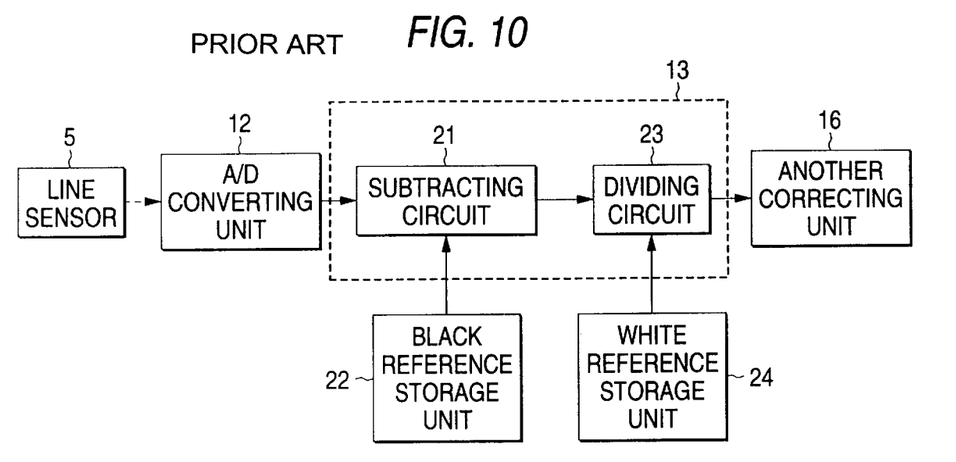
FIG. 10 is a schematic block diagram for indicating the shading correcting circuit of the conventional image reading apparatus.

The circuit of the conventional shading correcting unit is indicated in FIG. 10, and this shading correction is carried out in accordance with the following steps a), b), c), and d):

a) The electron charge stored in one element of the line sensor 5 is A/D-converted by the A/D converting unit 12 into the digital signal data Dn.

b) The digital signal data Dn derived from the A/D converter unit 12 is entered into the subtracting circuit 21, and this subtracting circuit 21 calculates a difference "Dn−Dk" between the digital signal data Dn and the black reference data Dk stored in the black reference storage unit 22.

c) The calculation result of the step b) is entered into the dividing circuit 23, and is divided by another difference "Dw−Dk" between the white reference data previously stored in the white reference storage unit 24 and the black reference data to thereby acquire the corrected data Dn'.

d) The steps defined from a) to c) are repeatedly performed as to the respective elements of the line sensor.

As described above, in accordance with the above-explained conventional shading correction, the fluctuations along the main scanning direction can be corrected.

Figure 11:
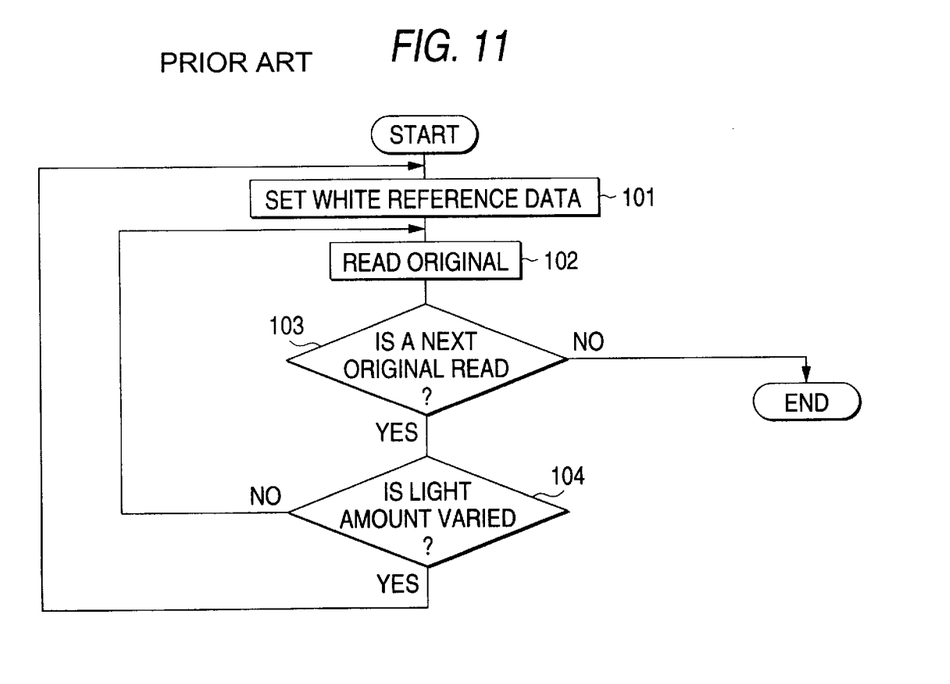
FIG. 11 is a flow chart for describing the sequential operation for reading a plurality of originals by the conventional image reading apparatus.

FIG. 11 is a flow chart for explaining one example of an original reading method by the conventional image reading apparatus for executing the above-described shading correction.

First of all, the white reference data is set at a step 101. At a step 102, the original is read while performing the shading correction as explained in the above steps a) to d) with employment of this white reference data. When a decision is made such that the next original is read at a step 103, if it is judged at a step 104 that the light amount of the light source is not varied when the white reference data is set, then the next original can be read by using the white reference data acquired during the previous reading operation while returning to the step 102.

However, in the above-described method, when it is so judged at the step 104 that the light amount is varied, the process operation is returned to the step 101 at which the white reference data is again set. In order to again set the white reference data, it requires a long time period. For example, in the case that an original having a size of A4 is read in reading precision of 600 [dpi], more than 5000 pieces of data must be set as the white reference data. As a consequence, when a plurality of originals are read, there is another problem that the time period required after the reading operation is commenced until this reading operation is completed is prolonged.

Also, the light amount of the light source is varied, depending upon the time elapse after turn-ON operation of the light source is commenced. In general, when time has passed just after the light source is turned ON, the light amount is gradually lowered. As a consequence, the shading corrections are required not only along the main scanning direction, but also along the sub-scanning direction.

Conventionally, the shading correction along the sub-scanning direction is carried out in such a manner that before the read data is digitalized, the analog data are corrected by using the light amount data of the light source, which are sequentially acquired. However, this conventional method owns such a drawback that the difficult control operation is required and also the image quality is readily lowered.

On the other hand, in accordance with the experiments made by the inventors (Applicants) of the present invention, such a fact could be found out. That is, as to the variation in the light amounts of the light source, the variation ratio thereof is substantially constant with respect to the light amount distribution along the main scanning direction.

While using the above-described experimental results, since the white reference data is corrected by a white reference correction coefficient in response to the variation in the light amounts, the re-setting operation of the white reference data can be omitted, and at the same time, the shading correction can be similarly carried out as to the sub-scanning direction.

SUMMARY OF THE INVENTION

An object of the present invention is to provide an image reading method and an image reading apparatus, capable of executing shading corrections along both a main scanning direction and a sub-scanning direction.

Another object of the present invention is to provide an image reading method and an image reading apparatus, capable of shortening a time duration required after the image reading operation is commenced until this image reading operation is accomplished.

An image reading method, according to an aspect of the present invention, comprises:

a) a step for detecting and setting sub-scanning white reference data when white reference data used in a shading correction is set;

b) a step for detecting sub-scanning white reference data in each of reading lines;

c) a step for setting as a white reference correction coefficient a value indicative of a specific relative relationship between the sub-scanning white reference data when the white reference data is set and the sub-scanning white reference data in the respective reading lines; and d) a step for reading the original while executing a shading correction with employment of white reference data corrected by the white reference correction coefficient;

wherein, in the case that a plurality of the originals are read, the steps b), c), and d) are repeatedly performed.

Accordingly, since the re-setting operation of the white reference data can be omitted with respect to the originals subsequent to the second original, the time period required after the reading operation of the image is commenced until this reading operation is ended, can be shortened.

The value indicative of the specific relative relationship acquired at the step c) is equal to a ratio of a difference between the sub-scanning white reference data when the white reference data is set and black reference data to another difference between the sub-scanning white reference data in the respective reading lines and the black reference data.

Also, an image reading apparatus, according to another aspect of the present invention, comprises:

a line sensor for converting light from an original into an electric signal;

an A/D converting unit for converting the electric signal derived from the line sensor into a digital signal;

a white reference storage unit for storing white reference data set before the original is read;

a black reference storage unit for storing black reference data set before the original is read; and a shading correcting unit for shading-correcting an output signal derived from the A/D converting unit with employment of both white reference data corrected by a white reference correction coefficient and the black reference data; wherein the white reference correction coefficient is a value indicative of a specific relative relationship between sub-scanning white reference data when the white reference data is set and sub-scanning reference data in each of reading lines.

As a result, the shading corrections can be carried out not only along the main scanning direction, but also along the sub-scanning direction. Also, when a plurality of documents are read, even when the re-setting operation of the white reference data is omitted with respect to the originals subsequent to the second original, the shading corrections can be properly carried out, and the time period required after the reading operation of the image is commenced until this reading operation is ended, can be shortened.

The value indicative of the specific relative relationship is equal to a ratio of a difference between the sub-scanning white reference data when the white reference data is set and black reference data to another difference between the sub-scanning white reference data in the respective reading lines and the black reference data.

BRIEF DESCRIPTION OF THE DRAWINGS

FIG. 6 graphically represents a variation in light amounts with respect to time elapse after a light source is turned ON;

DETAILED DESCRIPTION OF THE PREFERRED EMBODIMENTS

Referring now to drawings, preferred embodiments of the present invention will be described in detail.

Figure 2:
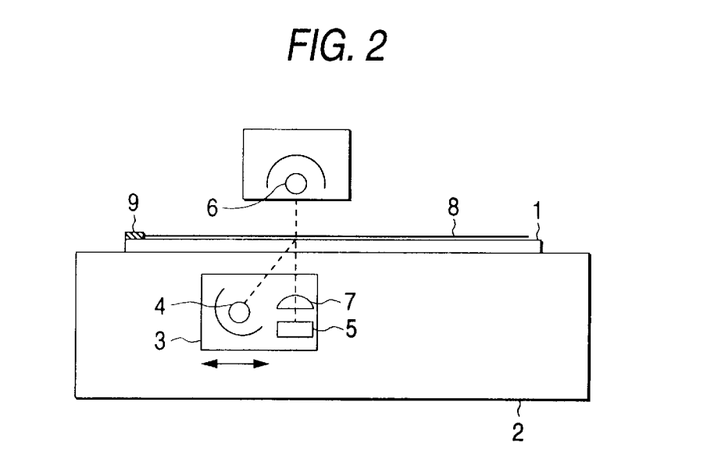
FIG. 2 schematically represents a structure of a flat bed type image reading apparatus according to an embodiment of the present invention.

In FIG. 2, there is schematically shown a structure of a flat bed type image reading apparatus according to an embodiment of the present invention.

An original base 1 made of a transparent plate such as glass is provided on an upper surface of a box type housing 2.

Inside the housing 2, a carriage 3 is provided which can be reciprocated by a drive apparatus (not shown) in parallel to the original base 1, and both a light source 4 and a line sensor 5 are mounted on this carriage 3. Irradiation light of the light source 4 is reflected on a surface of an original 8 mounted on the original base 1, and the reflected light is condensed by a condenser lens 7 onto the line sensor 5. As the line sensor 5, for instance, a charge storage type optical sensor such as a CCD is used.

To read a transparency original such as a photograph film, a second light source 6 transportable in conjunction with the transport of the carriage 3 is provided above the original base 1.

Figure 3:
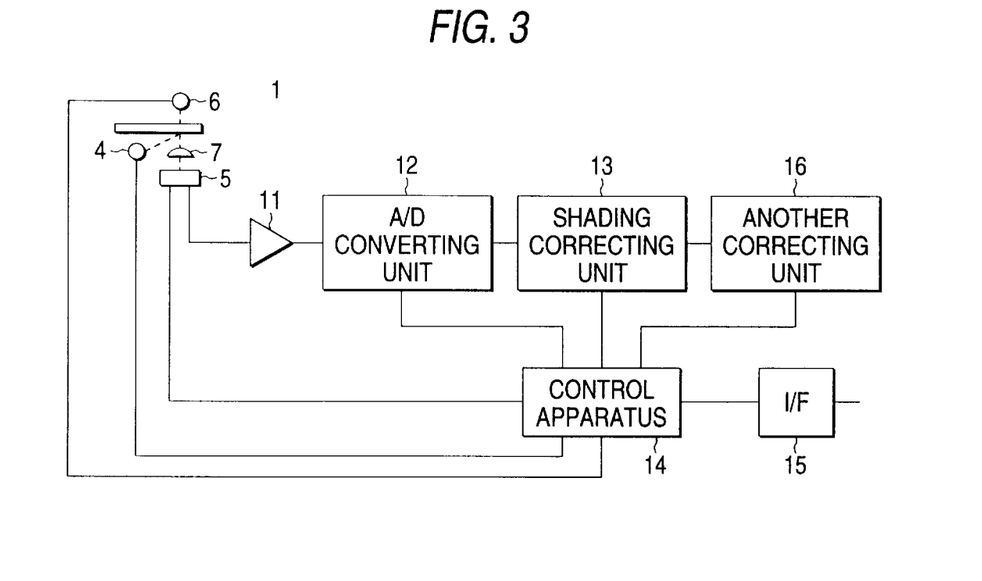
FIG. 3 is a functional block diagram for showing a signal processing apparatus of the image reading apparatus according to the embodiment of the present invention.

FIG. 3 is a functional block diagram for indicating an arrangement of a signal processing apparatus employed in the image reading apparatus constructed like the above-described arrangement.

In this drawing, an A/D converting unit 12 converts data entered from the line sensor 5 via an amplifier 11 into a digital signal, and then supplies this digital signal to a shading correcting unit 13.

The shading correcting unit 13 accomplished according to an embodiment of the present invention may correct digitalized read data based on the following formula by using black reference data which has been previously stored, white reference data as to the respective photoelectric converting elements of the line sensor 5, and a white reference correction coefficient:

$$Dn' = A \cdot (Dn - Dk)/[C \cdot (Dw - Dk)],$$

where symbol "Dn" shows digital signal data before being corrected, symbol "Dk" shows the black reference data, symbol "Dw" represents the white reference data, symbol "A" indicates a constant, symbol "C" is a white reference correction coefficient, and symbol "Dn'" denotes data after being shading-corrected. For example, in the case that reading gradation is selected to be 8 bits, this constant "A" is equal to 255. In the case the reading gradation is selected to be 12 bits, this constant "A" is equal to 4,095.

A control apparatus 14 is constructed of a microcomputer including a CPU, a RAM, a ROM and so on. This control apparatus 14 controls the entire system of the image reading apparatus, and is connected via an interface 15 to an external image processing apparatus, for instance, a personal computer. In another correcting unit 16, a gamma correction, a color correction, and various conversions such as edge enhancement and region enlargement/reduction are carried out.

Figure 4:
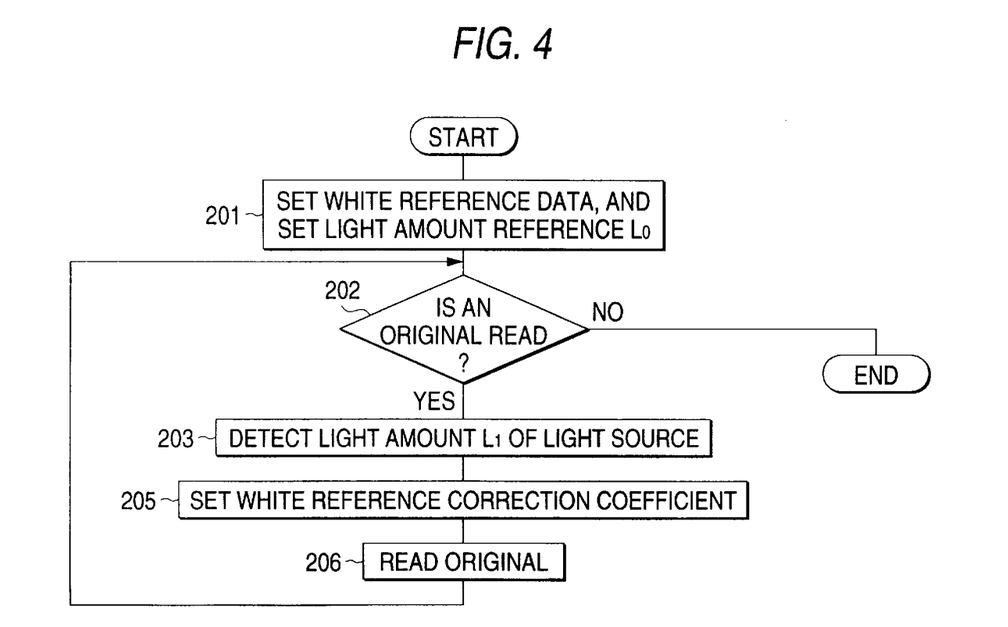
FIG. 4 is a flow chart for describing a sequential operation executed when a plurality of originals are read by the image reading apparatus of the embodiment of the present invention.

Next, operations executed when a plurality of originals are read out by the image reading apparatus constructed as described above, will be described. FIG. 4 is a flow chart for describing a sequential operation of reading of the plural originals.

(1) SETTING OF WHITE REFERENCE DATA AND LIGHT AMOUNT REFERENCE

First, when the power supply of the image reading apparatus is turned ON, both black reference data Dk and white reference data Dw are set.

Read data acquired when the power supply is turned OFF is A/D-converted by the A/D converting unit 12 into digital data, and this digital data is used as the black reference data Dk. It should be understood that since the fluctuations of the black reference data Dk along the main scanning direction and the variations thereof due to the lapse of time are lower than those of the white reference data Dw, the typical black reference data Dk is once set when the power supply is turned ON and this typical black reference data Dk may be employed.

At a step 201, both the white reference data and the light amount reference are set. When the white reference data is set, the carriage 3 is moved to an edge portion of the original base 1, and the light source 4 is turned ON, so that light reflected from a reflection plane having a uniform high reflectivity is read by the respective photoelectric converting elements of the line sensor 5. This reflection plane having uniform high reflectivity is provided as a main scanning white reference 9 on the original surface side of the original base 1. It should be noted that when a transparency original is used, the light emitted from the light source 6 is read without passing through the original. The read data is A/D-converted by the A/D converting unit 12 into digital data. This digital data is stored as the white reference data Dw into a white reference storage unit 24. The white reference data Dw owns a specific value with respect to each of the photoelectric converting elements of the line sensor 5. As the white reference storage unit 24, a memory such as a RAM (random access memory) may be employed.

It should be noted that if a difference (Dw−Dk) between the white reference data Dw and the black reference data Dk is stored in the white reference storage unit 24, then it is possible to omit a calculation during reading operation at the subsequent steps.

Figure 5:
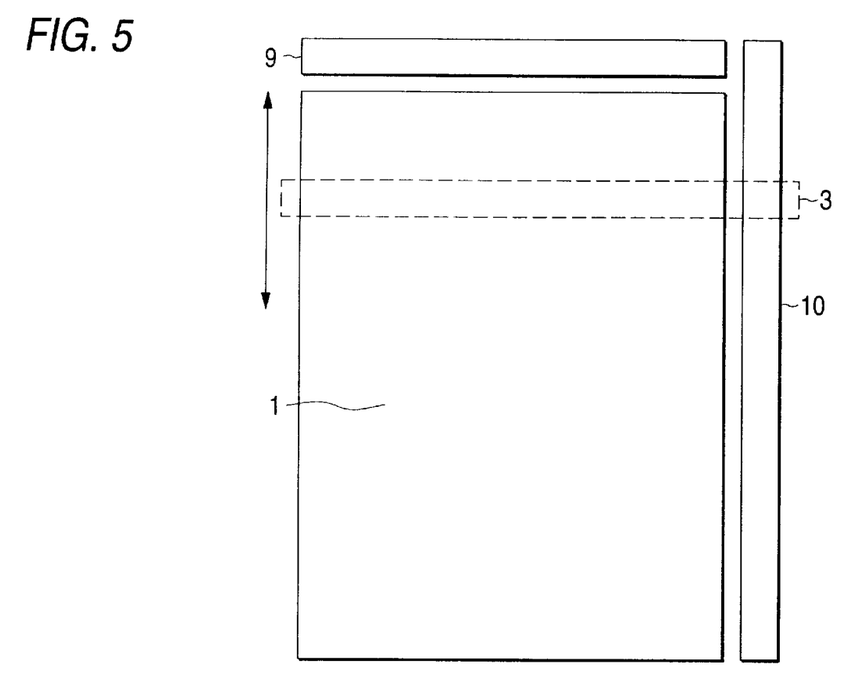
FIG. 5 is a plan view for indicating a position of a main scanning white reference and a position of a sub-scanning white reference in the flat bed type image reading apparatus according to the present invention.

In this case, the main scanning white reference 9 is read by using one element of the line sensor 5, and then this read signal is A/D-converted by the A/D converting unit 12 into a digital value. A difference between this digital value and the value of the black reference data is set as a light amount reference "L0". This light amount reference "L0" may be employed when a white reference correction coefficient may be set in the subsequent stage. Also, as indicated in FIG. 5, a sub-scanning white reference 10 is provided along the sub-scanning direction perpendicular to the main scanning direction, and the sub-scanning white reference 10 is read by employing the photoelectric converting elements of the line sensor 5, which are located near the right edge of this line sensor 5 when the main scanning white reference is read to acquire sub-scanning white reference data "W0". As a result, a light amount reference "L0" (=W0−Dk) may be set.

Alternatively, the light amount reference L0 may be set by directly reading the light amount of the light source by using a sensor (not shown).

(2) INSTRUCTION OF ORIGINAL READING OPERATION

At a step 202, the image reading apparatus waits for an instruction for instructing whether or not the original is read. Concretely, a user connects a personal computer (not shown) to the interface 15 of the image reading apparatus, and sets the original 8 on the original base 1. Then, when the user designates a range via the personal computer and instructs the execution of the reading operation, the process operation is advanced to a next step.

(3) DETECTION OF LIGHT AMOUNT OF LIGHT SOURCE

At a step 203, a light amount "L1" of the light source before the original is read is detected. The light amount L1 of the light source may be detected by way of the same detecting method employed when the light amount reference "L0" is set at the previous stage (1).

Also, in such a case that the light amount L1 of the light source is set by reading the sub-scanning white reference 10, or by directly reading it by the line sensor, the light amount L1 of the light source may be detected in each of the reading line (which will be explained later).

(4) SETTING OF WHITE REFERENCE CORRECTION COEFFICIENT

Figure 6:
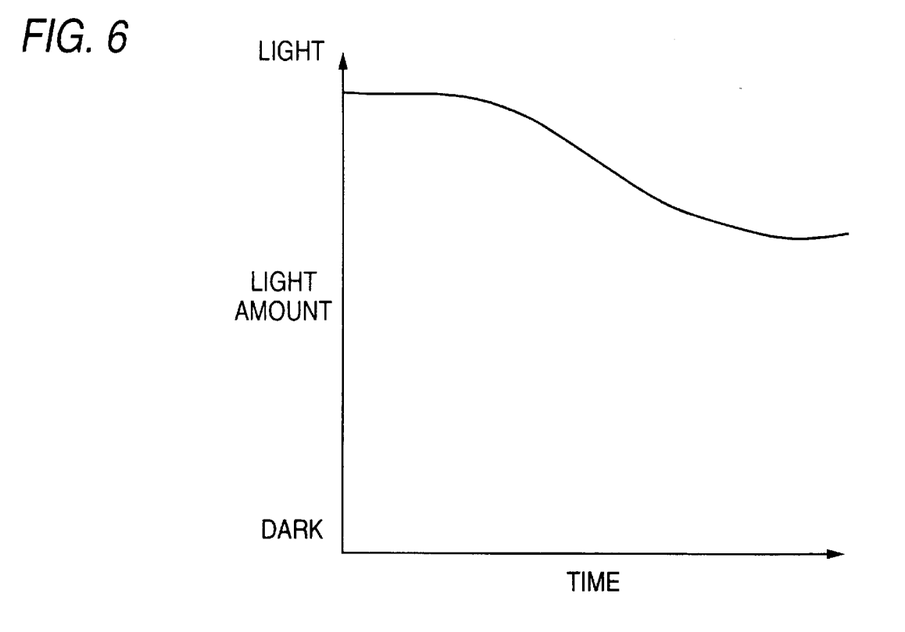

As graphically shown in FIG. 6, light amounts of the light source are varied, depending upon temperatures and a time elapse after the power supply is turned ON. As an experimental result made by the inventors (Applicants) of the present invention, the inventors could recognize that as to a variation in the light amounts of the light source, a variation rate with respect to the light amount distribution along the main scanning direction is constant.

Figure 7:
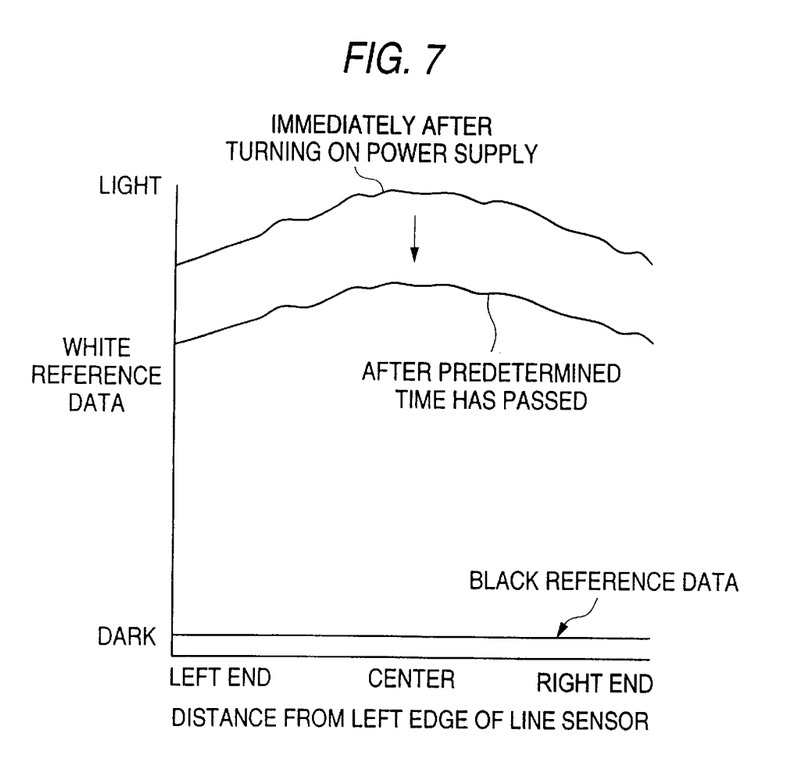
FIG. 7 graphically represents a variation in distributions of white reference data corresponding to a position of a line sensor with respect to time elapse.

As a consequence, the following relationship can be established:

$$(Aw1-Dk)/(Bw1-Dk) \approx (Aw2-Dk)/(Bw2-Dk) \approx \ldots \approx (Awn-Dk)/(Bwn-Dk),$$

assuming now that the white reference data of the first element up to the n-th element of the line sensor are Aw1, Aw2, ..., Awn which are set when the light amount of the source owns a certain amount; the white reference data after the light amount of the light source is varied are Bw1, Bw2, Bwn; and the black reference data is Dk. For example, when the light of the light source becomes dark after predetermined time has passed, a distribution of the white reference data is graphically represented in FIG. 7. When this distribution result is utilized, if the white reference correction coefficient is set as described below to thereby correct the white reference data, then the adverse influence caused by the variation in the light amounts of the light source can be corrected.

At a step 205, a white reference correction coefficient "C" is calculated based upon the following formula to be set by using the light amount reference L0 set when the white reference is set, and also the light amount "L1" of the light source which has been detected before the original is read:

$$C=L1/L0=(W1-Dk)/(W0-Dk).$$

The setting operation of the white reference data takes a long time period since the white reference should be read by all of the elements of the line sensor, whereas since the white reference correction coefficient can be set by detecting one light amount "L1" of the light source, the setting operation is accomplished within a short time period.

(5) READING OF ORIGINAL

At a step 206, the original is read. The control apparatus 14 turns ON the light source 4 (in case of transparency original, light source 6 is turned ON), and sequentially transports the carriage 3 to the respective reading line positions. As a result, at the respective reading line positions, electric charges (signal charges) are stored into the line sensor 5, the amounts of which are directly proportional to the reflectivity (or transmissivity) of the original 8. The charges stored in the line sensor 5 are outputted from this line sensor 5 to the amplifier 11 after a predetermined time period has passed, and the line sensor 5 is moved to the next reading line position.

The output signals derived from the respective photoelectric converting elements of the line sensor 5 are amplified by the amplifier 11, and thereafter the amplified output signals are A/D-converted by the A/D converting unit 12 into digital light amount signal Dn which are sequentially outputted to the shading correcting circuit 13.

Figure 1:
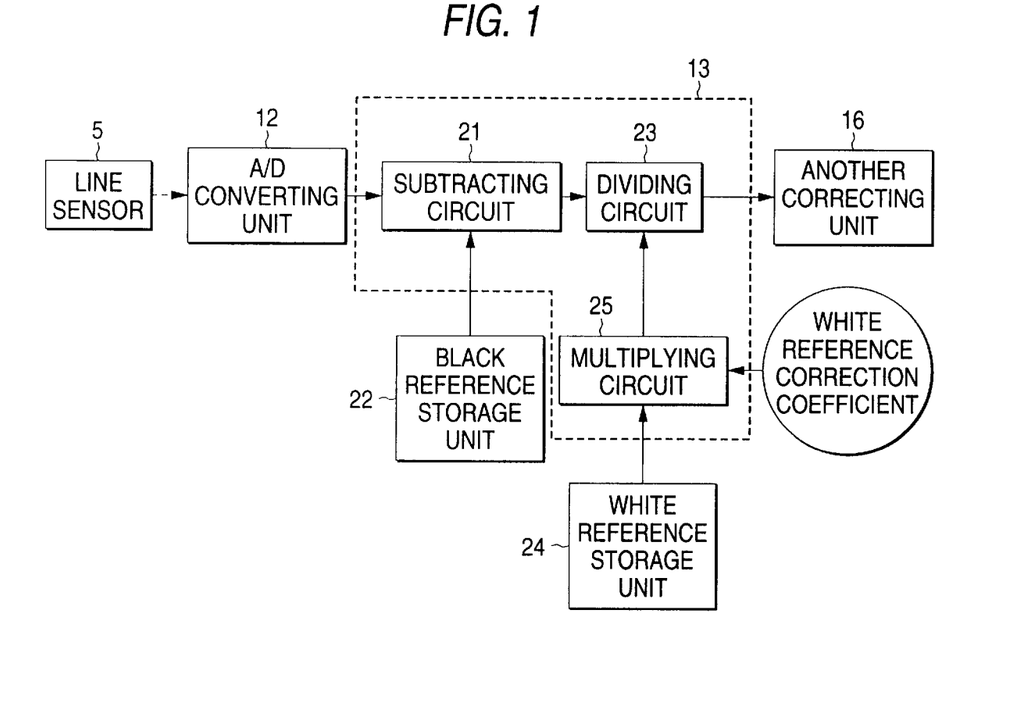
FIG. 1 is a schematic block diagram for indicating a circuit of a shading correcting unit employed in an image reading apparatus according to an embodiment of the present invention.

A circuit of the shading correcting unit 13, according to the embodiment of the present invention, is represented in FIG. 1. This shading correcting unit 13 executes the shading correction as defined in the following steps A) to E):

A) The digital light amount data "Dn" derived from the A/D converting unit 13 is entered into a subtracting circuit 21 in which a difference (Dn–Dk) between the digital light amount signal data Dn and the black reference data Dk of the black reference storage unit 22 is calculated.

B) Next, in a multiplying circuit 25, both the white reference data Dw stored in the white reference storage unit 24 and the black reference data Dk stored in the black reference storage unit 22 are multiplied by the white reference correction coefficient C to make correction.

C) Next, the output data (Dn–Dk) from the subtracting circuit 21 is divided by the output C.(Dw–Dk) derived from the multiplying circuit 25 by a dividing circuit 23 to calculate corrected data Dn'.

D) The corrected data Dn' is outputted to another correcting unit 16. The various conversions such as the gamma correction and the enlargement/reduction are carried out to the corrected data Dn' supplied to another correcting unit 16. The converted data is supplied via the interface 15 to a personal computer and the like.

E) Subsequently, the process operations defined from the above-described steps A) to D) are repeatedly performed to signals outputted from the respective photoelectric converting elements of the line sensor 5.

As to the next reading line, the above-described process operations are repeatedly performed to thereby read the image within the designated range.

In such a case that the light amount of the light source is directly read by the sensor to be detected, or the sub-scanning white reference 10 is read to be detected, the light amount L1 of the light source is detected every reading line, and the white reference correction coefficient C is set with respect to each of the reading lines, so that even variations in the light amounts produced while one sheet of the original is read, may be corrected by the shading correcting unit 13. In other words, the shading correction can be performed also as to the light amount variation along the sub-scanning direction.

Figure 8:
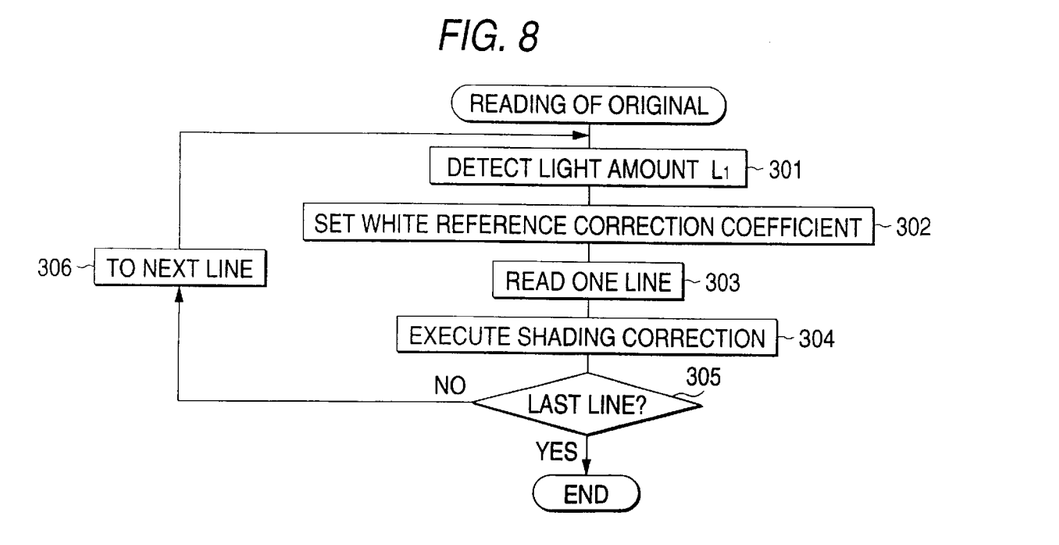
FIG. 8 is a flow chart for describing a sequential operation for reading an original by the image reading apparatus of the embodiment of the present invention.

Referring now to a flow chart shown in FIG. 8, this operation defined at the step 206 will be described more in detail. In FIG. 8, the light amount L1 of the light source in the respective reading lines is detected at a step 301, and the white reference correction coefficient C is set at a step 302 in a similar manner to the above step 205. At a step 304, the shading correction is carried out to the data Dn of one reading line read at the step 303, by using the white reference correction coefficient C in accordance with the above-described steps A) to E). At a further step 305, when the line read at the step 303 corresponds to a last reading line designated before the document is read, the reading operation is accomplished. Conversely, when this read line is not equal to the last reading line designated before the document is read, the carriage is moved to the next reading line, and thereafter the process operation is returned to the step 301.

After the process operations defined at the steps 201, 202, 203, 205, and 206 are performed, one sheet of the original is read. When the next original is read, the process operation is returned to the step 202. Since the setting operation of the white reference data defined at the step 201 can be omitted, the time periods required from the commencement of the original reading operation to the end of the original reading operation can be shortened when a plurality of originals are read. Also, while the variation data about the white reference correction coefficient caused by the time elapse after the light source is turned ON is previously stored in the white reference correction storage unit, the proper data are read by the control apparatus 14 in response to the time elapse after turning-ON-operation of the light source is commenced, and these read data are used as the white reference correction coefficient C, so that the stage for detecting the light amount of the light source may be omitted.

Figure 9:
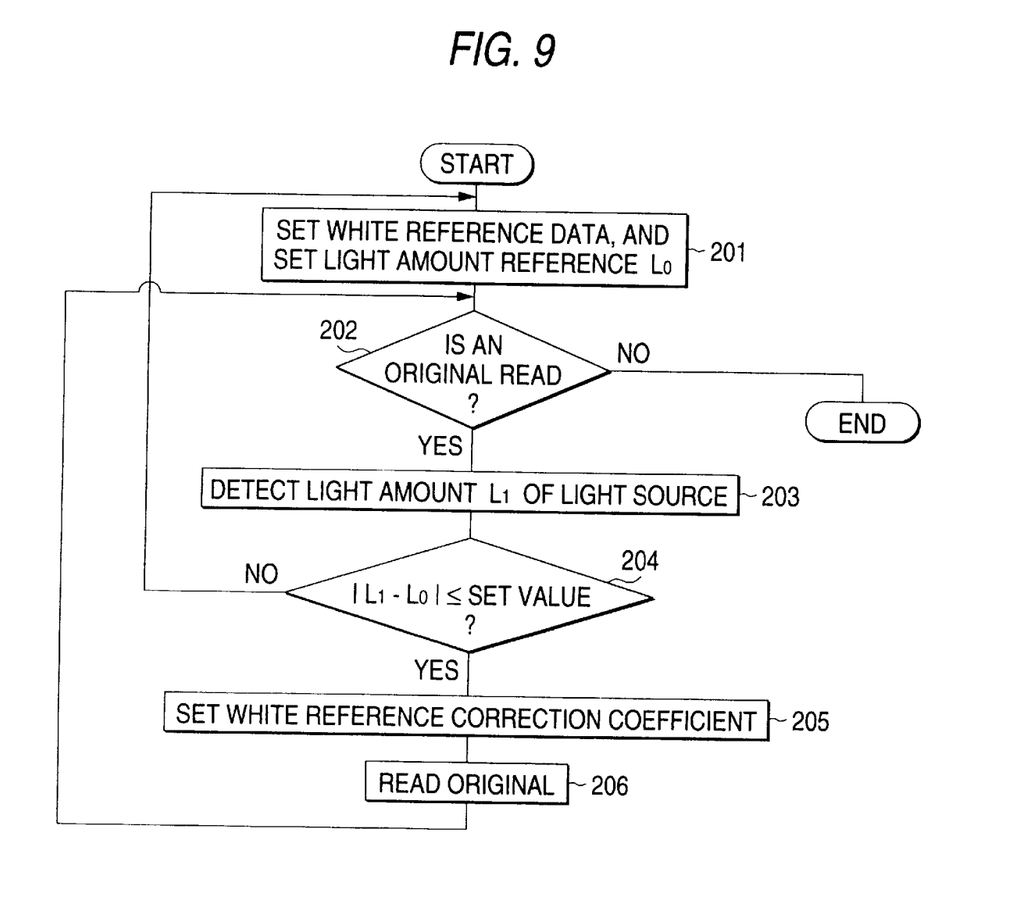
FIG. 9 is a flow chart for describing a sequential operation for reading a plurality of originals by an image reading apparatus according to another embodiment of the present invention.

FIG. 9 is a flow chart for explaining another embodiment of the present invention, namely in a case that a plurality of originals are read.

In this embodiment, a step 204 is involved subsequent to a step 203 at which the light amount L1 of the light source is detected. At the step 204, if an absolute value |L1−L0|= (|w1−w0|) of a difference between the light amount reference L0 and the light amount L1 of the light source is smaller than, or equal to a certain setting value, then the process operation is advanced to the next step 205. At this step 205, the original is read. If the absolute value |L1−L0| is larger than a certain set value, then the process operation is returned to the step 201. Then, after the white reference data is again set so as to correctly read the original, the originals can be read.

What is claimed is:

1. An image reading method in which an original is irradiated by a light source and light from the original is converted into an electric signal, said image reading method comprising:

a) a step for detecting and setting sub-scanning white reference data when white reference data used in a shading correction is set;

b) a step for detecting sub-scanning white reference data in each of reading lines;

c) a step for setting as a white reference correction coefficient a value indicative of a specific relative relationship between the sub-scanning white reference data when said white reference data is set and the sub-scanning white reference data in the respective reading lines; and d) a step for reading the original while executing a shading correction with employment of white reference data corrected by said white reference correction coefficient;

wherein when a plurality of originals are read, said steps b), c), and d) are repeatedly performed.

2. An image reading method as claimed in claim 1, wherein said value indicative of said specific relative relationship is equal to a ratio of a difference between the sub-scanning white reference data when said white reference data is set and black reference data to another difference between said sub-scanning white reference data in the respective reading lines and said black reference data.

3. An image reading method as claimed in claim 1, further comprising:

e) a step for judging a difference between said sub-scanning white reference data and sub-scanning white reference data acquired before a next original is read, said step e) being provided between said step b) and said step c); wherein when said difference is larger than a set value, said image reading method is returned from said step e) to said step a), whereas when said difference is smaller than or equal to the set value, said image reading method is returned from the step e) to said step c).

4. An image reading apparatus for irradiating an original by a light source and for converting light from the original into an electric signal, comprising:

a line sensor for converting the light from the original into the electric signal;

an A/D converting unit for converting the electric signal derived from the line sensor into a digital signal;

a white reference storage unit for storing white reference data set before the original is read;

a black reference storage unit for storing black reference data set before the original is read; and a shading correcting unit for shading-correcting an output signal derived from said A/D converting unit with employment of both white reference data corrected by a white reference correction coefficient and said black reference data;

wherein said white reference correction coefficient is a value indicative of a specific relative relationship between sub-scanning white reference data when said white reference data is set and sub-scanning reference data in each of reading lines.

5. An image reading apparatus as claimed in claim 4, wherein said value indicative of said specific relative relationship is equal to a ratio of a difference between the sub-scanning white reference data when said white reference data is set and black reference data to another difference between said sub-scanning white reference data in the respective reading lines and said black reference data.

6. An image reading apparatus as claimed in claim 4, wherein said shading correcting unit includes:

a multiplying circuit for correcting said white reference data by said white reference correction coefficient;

a subtracting circuit for subtracting said digital signal from said black reference data; and a dividing circuit for dividing said subtracted digital signal by a difference between corrected white reference data and said black reference data.

7. An image reading apparatus as claimed in claim 4, wherein said sub-scanning white reference data is detected by reading a sub-scanning white reference by a portion of said line sensor.

8. An image reading apparatus as claimed in claim 7, wherein said image reading apparatus comprises a white reference correction coefficient storage unit for previously storing a set value of the white reference correction coefficient in accordance with a lapse of time after turning-ON of the light source is commenced, instead of detecting said sub-scanning white reference data.

9. An image reading apparatus as claimed in claim 4, wherein a difference between said white reference data and said black reference data is stored in said white reference storage unit.

* * * * *